United States Patent [19]
Uchida

[11] 3,722,931
[45] Mar. 27, 1973

[54] SWIVEL JOINT
[75] Inventor: Yasuo Uchida, Hamamatsu, Japan
[73] Assignee: Ishikawa Tekko Kabushiki Kaisha, Tokyo, Japan
[22] Filed: Oct. 26, 1971
[21] Appl. No.: 192,068

[30] Foreign Application Priority Data
Nov. 5, 1970 Japan.................................45/97415

[52] U.S. Cl..................287/93, 287/85 A, 287/90 R, 280/95 A
[51] Int. Cl.............................................F16b 17/00
[58] Field of Search.....287/93, 90 R, 87, 90 C, 85 A; 280/95 A

[56] References Cited
UNITED STATES PATENTS

| | | | |
|---|---|---|---|
| 3,408,124 | 10/1968 | Melton et al. | 287/93 X |
| 3,018,124 | 1/1962 | Flumerfelt | 287/85 A |
| 2,708,590 | 5/1955 | Latzen | 287/90 C |
| 2,993,717 | 7/1961 | Gottschald | 287/90 C |

FOREIGN PATENTS OR APPLICATIONS 895,068   4/1962   Great Britain......................287/90 R Primary Examiner—Andrew V. Kundrat
Attorney—Stevens, Davis, Miller & Mosher

[57] ABSTRACT

A swivel joint comprising a stud having an upper cylindrical stem portion, a lower cylindrical stem portion and a substantially spherical member disposed between said upper and lower cylindrical stem portions, an annular upper bearing member and an annular lower bearing member, and a socket receiving therein and supporting said upper and lower bearing members. Said annular upper bearing member and an annular lower bearing member receive therein and support an upper half of said substantially spherical member and said upper cylindrical stem portion contiguous therewith and a lower half of said substantially cylindrical member and said lower cylindrical stem portion contiguous therewith respectively to act as a bearing.

2 Claims, 1 Drawing Figure

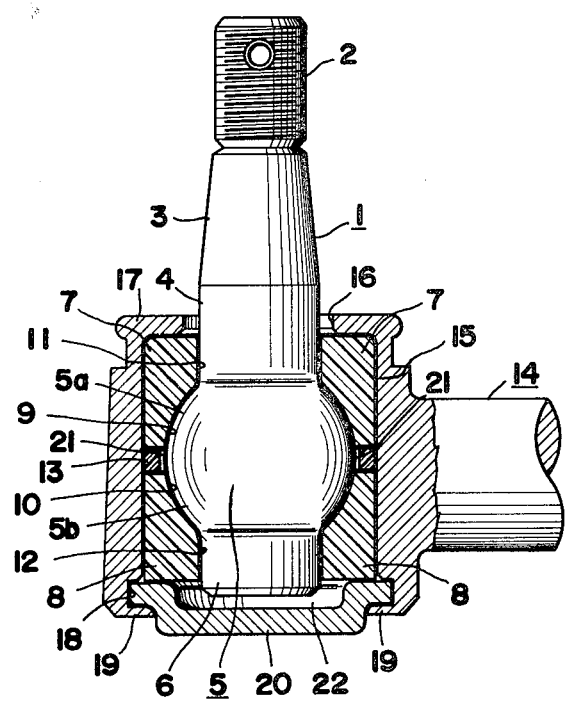

SWIVEL JOINT

This invention relates to swivel joints used in arm swinging portions of a linkage, and more particularly it is concerned with a swivel joint having particular utility as a joint for connecting an idler arm or Pitman arm with a relay rod or center rod in a steering linkage for motor vehicles for transmitting a steering motion.

Heretofore, it has been customary in joints of the type described to provide a flange-like receive seat in the head of a stud supported by bearing members so that a thrust directed axially of the stud can be borne by such seat. Some disadvantage is, however, associated with this arrangement. When a stud is subjected to a tilting load, the flange-like receive seat of the stud is tilted with respect to the support portion of the bearing member, so that the flange-like receive seat of the stud is locally brought into point or line contact with the bearing members. This results in an extreme-pressure being applied to the contact surface, thereby causing wear to develop rapidly on the bearing surface.

Accordingly, one object of this invention is to obviate the aforementioned disadvantage of the prior art. This invention has as its object the provision of a swivel joint resilient and durable which is capable of operating smoothly, absorbing a force of impact exerted thereon, and restoring itself to its original position when a tilting load is applied to the stud.

According to this invention, there is provided a swivel joint wherein the enlarged spherical member formed at an end portion of the cylindrical stem of the stud and the upper and lower cylindrical stems of the stud are rotatably supported by bearing members made of an elastomer material while their swinging motions are precluded.

Additional objects as well as features and advantages of this invention will become evident from the description set forth hereinafter when considered in conjunction with the accompanying drawing, in which:

FIGURE is a vertical sectional side view of the swivel joint comprising one embodiment of this invention.

The joint is shown as comprising a stud 1 made of metal which is formed at one end portion thereof with a threaded portion 2 for threadably connecting the joint to other member. Threaded end portion 2 is contiguous with a tapering portion 3 for mounting the joint on a linkage which is contiguous at its major diameter end with one end of a cylindrical stem 4. Cylindrical stem 4 is formed at the other end portion thereof with one end of a substantially spherical member 5 of larger diameter than stem 4 and coaxial therewith, which spherical member 5 is contiguous at the other end thereof with another cylindrical stem 6 which is coaxial with cylindrical stem 4.

The joint further comprises two annular bearing members 7 and 8 one disposed above the other and made of an elastomer material, such for example as polyurethane, nylon or the like. Bearing members 7 and 8 are formed on their inner peripheral surfaces with a concave arcuate surface portion 9 and a cylindrical surface portion 11 and a concave arcuate surface portion 10 and a cylindrical surface portion 12 respectively. The concave arcuate surface portion 9 and cylindrical surface portion 11 of annular bearing member 7 conform in shape to an upper half 5a of substantially spherical member 5 and cylindrical stem 4 contiguous therewith, and the concave arcuate surface portion 10 and cylindrical surface portion 12 of annular bearing member 8 conform in shape to a lower half 5b of substantially spherical member 5 and cylindrical stem 6 contiguous therewith, so that upper and lower annular bearing members 7 and 8 enclose cylindrical stem 4, substantially spherical member 5 and cylindrical stem 6 therein in intimate contact therewith.

Interposed between upper and lower bearing members 7 and 8 is a ring 13 made of polyacetal or other hard plastic which surrounds substantially spherical member 5. Ring 13 serves as a bearing which bears a swinging load applied to stud 1 in a direction normal thereto.

The joint further comprises a socket 14 formed on its inner peripheral surface with a cylindrical surface portion 15 which is substantially of the same diameter as annular bearing members 7 and 8. Socket 14 is also formed at one end thereof with an upper opening 16 of a larger diameter than the cylindrical stem 4 of stud 1 and an inwardly directed shoulder 17. Socket 14 is also formed in its inner side and below cylindrical surface portion 15 a lower cylindrical surface portion 18 which is larger in diameter than cylindrical surface portion, and an inwardly directed shoulder 19 contiguous with lower cylindrical surface portion 18.

Annular bearing members 7 and 8 enclosing therein the upper half 5a of substantially spherical member 5 and cylindrical stem 4 contiguous therewith and the lower half 5b of substantially spherical member 5 and cylindrical stem 6 contiguous therewith respectively for supporting the same are fitted in the interior of socket 14 so that the outer peripheral surfaces of bearing members 7 and 8 may be brought into intimate contact with the cylindrical surface portion 15 of socket 14, with the cylindrical stem 4 of stud 1 projecting outwardly through the opening 16 formed at the upper end of socket 14.

A closure member 20 is fitted in an opening formed at the lower end of socket 14 opposite to the upper end at which cylindrical stem 4 extends outwardly through opening 16 in such a manner that member 20 is force fitted in the opening to engage the peened or span shoulder 19 to provide a seal therein. At this time, upper and lower bearings 7 and 8 is preloaded by the inwardly directed shoulder 17 of socket 14 and closure member 20, so that bearing members 7 and 8 are brought into pressing contact with the spherical member 5 of stud 1. Thus, a swivel joint in which a predetermined work torque is produced is provided.

In assembling the swivel joint, a lubricant is sealed in a gap 21 between bearing members 7 and 8 and stud 1 and a gap 22 between closure member 20 and bearing member 8. A lubricant is also applied to sliding surfaces of the members of the joint beforehand.

The swivel joint according to this invention is constructed as aforementioned. When stud 1 is subjected to a thrust directed axially thereof, the spherical member 5 of stud 1 and the concave arcuate surface portions 9 and 10 of bearing members 7 and 8 respectively made of an elastomer material function as a thrust bearing, and bearing members 7 and 8 absorbs at the same time the impact of thrust. When stud 1 is subjected to a tilting load, the tilting load acts as a tilting moment which causes spherical member 5 to rotate about its center. Accordingly, the outer peripheral surface of spherical member 5 slides along the concave arcuate surface portions 9 and 10 of bearing members 7 and 8 respectively. The tilting moment is thus borne by the cylindrical surface portions 11 and 12 of bearing members 7 and 8 which are in contact with the cylindrical stems 4 and 6 of stud 1 respectively to serve as their bearings. Accordingly, there is no local point contact or line contact taking place between members of the swivel joint according to this invention, thereby precluding the occurrence of an extreme-pressure.

Since bearing members 7 and 8 are made of an elastomer material, such for example as polyurethane, nylon or the like, they not only undergo elastic deformation but also tend to return to their original positions by their resilience and absorb impact when subjected to a fall load as aforementioned.

Even if stud 1 is rotated while in an inclined position during the service, no extreme-pressure is applied to any element involved. Accordingly, the stud can be rotated smoothly in the inclined position with no abnormal wear being caused on the sliding surface of the bearing.

What is claimed is:

1. A swivel joint comprising
   a stud having an upper cylindrical stem portion, a lower cylindrical stem portion of the same diameter with said upper cylindrical stem portion and a substantially spherical member disposed between said upper and lower cylindrical stem portions;
   an annular upper bearing member and an annular lower bearing member made of a polyurethane elastomer receiving therein and supporting an upper half of said substantially spherical member and said upper cylindrical stem portion contiguous therewith and a lower half of said substantially spherical member and said lower cylindrical stem portion contiguous therewith respectively to act as a bearing, said upper and lower bearing members having the same configuration;
   a ring made of a hard plastic and interposed between said upper and lower bearing members to act as a bearing; and
   a socket receiving therein and supporting said upper and lower bearing members, said socket being formed at one end thereof with an opening for permitting said upper cylindrical stem portion of said stud to extend therethrough and at the other end thereof with an opening which is closed by a closure member in such a way that said upper and lower bearing members are preloaded by said closure member and a gap in which a lubricant is sealed is provided between said bearing members and closure member.

2. The swivel joint of claim 1, wherein said hard plastic ring is made of polyacetal.

* * * * *